United States Patent
Li et al.

(10) Patent No.: US 8,960,255 B2
(45) Date of Patent: Feb. 24, 2015

(54) FILM STRIPPING MECHANISM

(71) Applicants: BOE Technology Group Co., Ltd., Beijing (CN); BOE (HEBEI) Mobile Display Technology Co., Ltd., Hebei (CN)

(72) Inventors: Peng Li, Beijing (CN); Chunpei Sun, Beijing (CN); Tao Wang, Beijing (CN); Lingmian Meng, Beijing (CN); Yelei Xia, Beijing (CN)

(73) Assignees: BOE Technology Group Co., Ltd., Beijing (CN); BOE (Hebei) Mobile Display Technology Co., Ltd., Hebei (CN)

( * ) Notice: Subject to any disclaimer, the term of this patent is extended or adjusted under 35 U.S.C. 154(b) by 0 days.

(21) Appl. No.: 14/075,110

(22) Filed: Nov. 8, 2013

(65) Prior Publication Data

US 2014/0130987 A1    May 15, 2014

(30) Foreign Application Priority Data

Nov. 9, 2012    (CN) .......................... 2012 1 0448719

(51) Int. Cl.
*B32B 38/10*     (2006.01)
*B32B 43/00*     (2006.01)

(52) U.S. Cl.
CPC ............... *B32B 43/006* (2013.01); *B32B 38/10* (2013.01); *B32B 2457/20* (2013.01); *Y10S 156/924* (2013.01); *Y10S 156/937* (2013.01)
USPC ........... 156/762; 156/703; 156/717; 156/756; 156/761; 156/924; 156/937

(58) Field of Classification Search
None
See application file for complete search history.

(56) References Cited

U.S. PATENT DOCUMENTS

| 5,783,022 | A | 7/1998 | Cha et al. |
| 6,470,544 | B1 * | 10/2002 | Boschet et al. .............. 29/23.51 |
| 7,150,804 | B2 * | 12/2006 | Tajima ......................... 156/718 |
| 8,118,075 | B2 * | 2/2012 | Sampica et al. .............. 156/762 |

(Continued)

FOREIGN PATENT DOCUMENTS

| CN | 1899711 A | 1/2007 |
| CN | 102218425 A | 10/2011 |
| CN | 102253523 A | 11/2011 |
| CN | 202207694 A | 5/2012 |

OTHER PUBLICATIONS

First Chinese Office Action dated Jan. 30, 2014; Appln. No. 20120448719.2.

(Continued)

*Primary Examiner* — Mark A Osele
*Assistant Examiner* — Nickolas Harm
(74) *Attorney, Agent, or Firm* — Ladas & Parry LLP

(57) ABSTRACT

A film stripping mechanism, comprising: a base; a platform disposed on the base and having a substrate to be stripped of film placed thereon; a blade disposed above an upper surface of the platform and capable of contacting the substrate to be stripped of film placed on the platform, the platform and the blade being movable relative to each other so as to strip off a film on the substrate to be stripped of film; an automatic alcohol-spraying module contacting the blade for spraying outwards alcohol and allowing the alcohol to flow toward the substrate to be stripped of film along the blade. The film stripping mechanism can improve the yield rate of film stripping and the stripping efficiency, and reduce breakage rate of the substrates.

10 Claims, 2 Drawing Sheets

(56) References Cited

U.S. PATENT DOCUMENTS

| | | | |
|---|---|---|---|
| 8,261,804 B1* | 9/2012 | Huang | 156/762 |
| 2010/0154992 A1 | 6/2010 | Feinstein et al. | |
| 2011/0174445 A1* | 7/2011 | Ciliberti et al. | 156/752 |
| 2011/0198040 A1 | 8/2011 | Ebata et al. | |
| 2012/0125505 A1 | 5/2012 | Incavo et al. | |

OTHER PUBLICATIONS

Extended European Search Report issued Feb. 12, 2014; EP 13 19 2166.

Second Chinese Office Action Appln. No. 201210448719.2; Issued Sep. 9, 2014.

* cited by examiner

FILM STRIPPING MECHANISM

BACKGROUND

The embodiment of present invention relates to a film stripping mechanism.

In the display field, substrates, such as glass, plastics and the like, are required when making a display device, and the surface of the substrate is attached with films when being rolled out so as to ensure the integrity and cleanliness of the substrate, but during subsequent processes of using the substrate, the film thereon should be stripped away, and the prior art commonly takes off the film on the substrate manually in a manner of scraping using a knife. However this method has a greater force against the substrate, tends to cause damage to the substrate, and the working efficiency thereof is low, such that the operator may also bring about negative effect upon the substrate if he/she lacks of skill, causing waste of materials.

SUMMARY

The embodiment of present invention may improve efficiency of stripping film from substrates, and reduce damages to the substrate.

One aspect of the present invention provides a film stripping mechanism, comprising: a base; a platform movably disposed on the base, and the substrate to be stripped of film is placed on the platform; a blade disposed above the upper surface of the platform and capable of contacting the substrate to be stripped of film placed on the platform, the platform and the blade being movable relative to each other so as to strip away the film on the substrate to be stripped of film;

an automatic alcohol-spraying module contacting the blade for spraying outwards the alcohol and allowing the alcohol to flow toward the substrate to be stripped of film along the blade.

For example, the platform is movably disposed on the base, and the blade is fixedly disposed above the upper surface of the platform.

For example, a first stationary platen and a second stationary platen are disposed on the base along the moving direction of the platform. The platform is located between the first stationary platen and the second stationary platen. Each of the first stationary platen, the platform and the second stationary platen comprises a coaxial threaded bore respectively. The coaxial threaded bore is threadedly fitted with a lead screw. One end of the lead screw is connected to the drive motor for driving the lead screw to rotate, and the rotation of the lead screw in turn drives the platform to move.

For example, the base is provided with guide rails, and the platform cooperates with the guide rails and moves along the guide rails.

For example, the platform is provided with a substrate placement platform. The substrate placement platform is provided with a stopper at its edge, and the stopper is used to catch the substrate to be stripped of film placed on the substrate placement platform.

For example, the base is provided with a blade bracket at each side of the guide rail. The blade bracket is equipped with a blade holder thereon and the blade is disposed on the blade holder.

For example, the blade bracket comprises an elongate fixing hole, in which the blade holder is mounted.

For example, the blade holder comprises two holding plates, i.e., the upper and lower holding plates, and the blade is disposed between the two holding plates. The lower holding plate comprises a groove such that a gap is formed between the lower holding plate and the blade. The gap is coupled with the automatic alcohol spraying module.

For example, the automatic alcohol-spraying module comprises an alcohol container for storing alcohol, a pump connected with the alcohol container, and a conduit connected with the pump. An outlet of the conduit is coupled to the gap, and the width of the gap is consistent with that of the blade and the thickness of the gap is uniform.

For example, the stripping mechanism further comprises a control system connected with the drive motor and the pump respectively, and the control system regulates the starting, stopping and the rotation direction of the drive motor and controls the turning on and off of the pump.

The film stripping mechanism provided by the above technical solution, by arranging the blade and the platform to be movable relative to each other, for example, by securing the blade and making the substrate to be stripped of film move with respect to the blade while placed on the platform, and by further cooperating with the automatic alcohol-spraying module, uses the blade to achieve stripping off the film on the substrate, hence the manual operation is substituted with an automatic mechanism, improving the yield rate of film stripping and the stripping efficiency, and reducing the breakage rate of the substrate.

REFERENCE NUMERALS

1: base; 2: drive motor; 3: first stationary platen; 4: lead screw; 5: guide rail; 6: platform; 7: blade bracket; 8: substrate placement platform; 9: stopper; 10: blade holder; 11: blade; 12: control system; 13: second stationary platen; 14: alcohol container; 15: pump.

DETAILED DESCRIPTION

Further detailed description is made for the specific embodiments of the present invention below in conjunction with the attached drawings and examples. The following embodiments are used only for illustrating the present invention by way of example, but not limiting the scope of the present invention.

Figure 1:
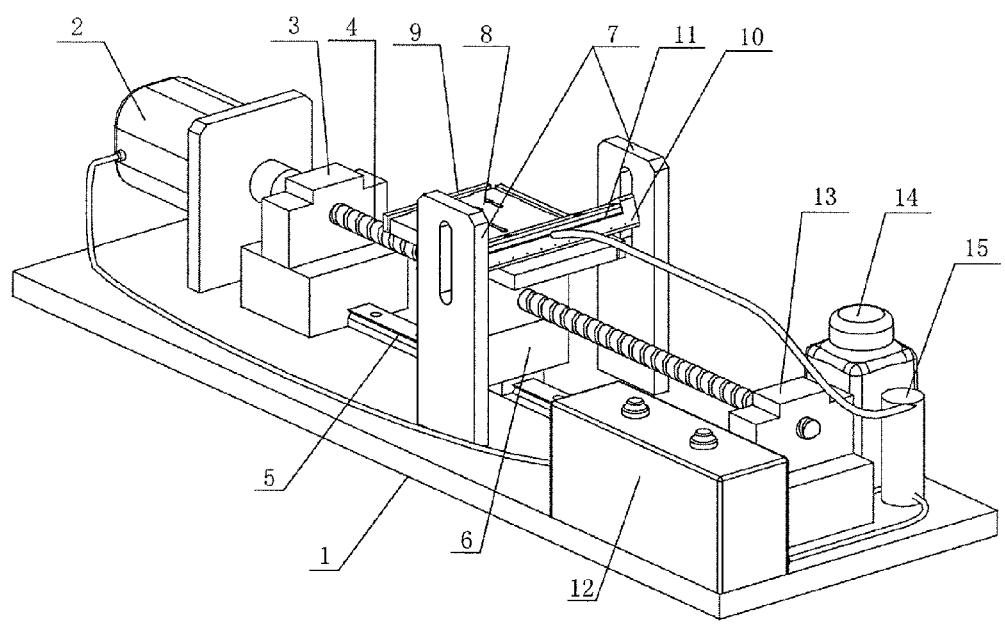
FIG. 1 is a structural representation of the film stripping mechanism of the embodiment of present invention.
Figure 2:
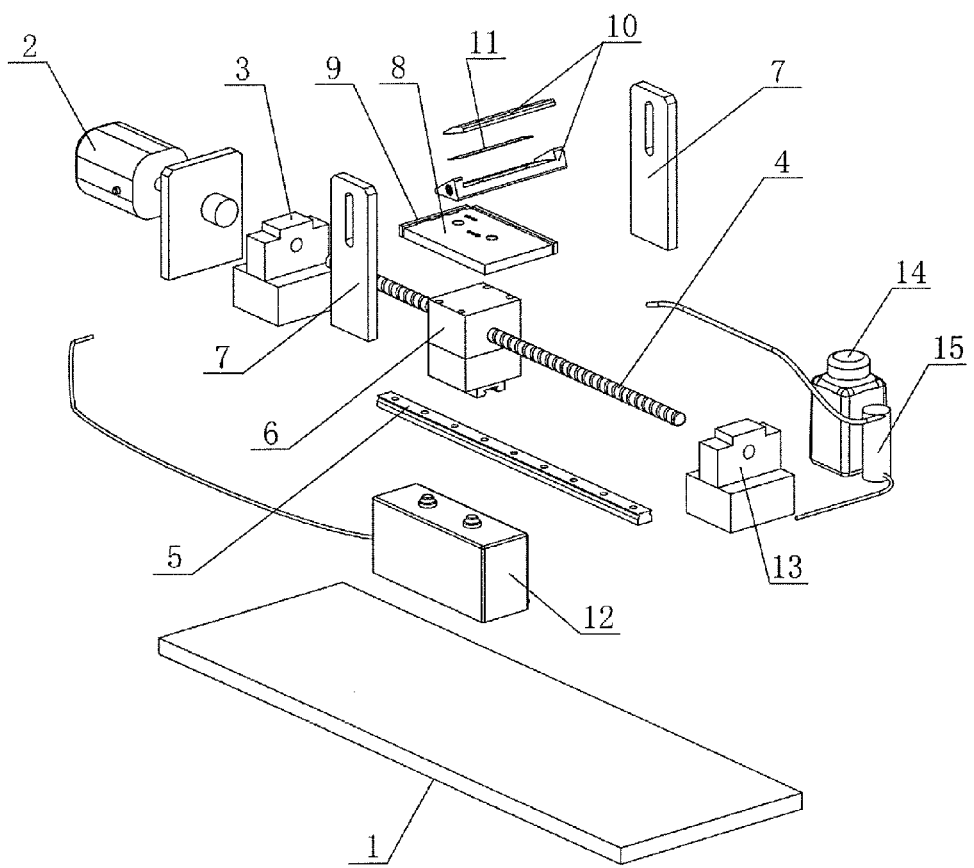
FIG. 2 is an exploded schematic view of the film stripping mechanism of FIG. 1.

FIG. 1 is a structural representation of the film stripping mechanism of one exemplary embodiment of the present invention, and FIG. 2 is an exploded view of the mechanisms in FIG. 1. It is shown in the drawings that the stripping mechanism of this embodiment comprises a base 1, a platform 6, a blade 11 and an automatic alcohol-spraying module. The base 1 is used as the support member for supporting the entire mechanism on which the platform 6, the blade 11 and the automatic alcohol-spraying module are mounted. The platform 6 is movably disposed on the base 1, and the substrate to be stripped of film is placed on the platform 6. The blade 11 is disposed above the upper surface of the platform 6, for example, fixed above the upper surface of the platform 6, and contacts the substrate to be stripped of film placed on the platform 6 to strip off the film on the substrate to be stripped of film. The automatic alcohol-spraying module contacts the blade 11, for spraying outwards the alcohol and allowing for the alcohol flow toward the substrate to be stripped of film along the blade 11. This film-stripping mechanism combines in a cooperative manner film-stripping by blade and alcohol spraying, which are both performed in an automatic way in place of manually film-stripping, thus improving the efficiency and yield rate of film-stripping, and reducing the working labour of operators. Moreover, by combining the film-stripping by blade with the alcohol spraying, the force applied against the substrate can be reduced and thus the breakage rate of the substrate is depressed.

The displacement movement of the platform 6 in this embodiment can be achieved through the following configuration. Specifically, a first stationary platen 3 and a second stationary platen 13 are disposed on the base 1 along the moving direction of the platform 6. The platform 6 is located between the first stationary platen 3 and the second stationary platen 13. The first stationary platen 3, the platform 6 and the second stationary platen 13 respectively comprises a coaxial threaded bore, which threadly fits onto the lead screw 4. The rotation of the lead screw 4 can drive the platform 6 move along the lead screw 4, thereby achieving movement of the substrate to be stripped of film, being placed on the platform 6, with respect to the blade 11.

The rotation of the lead screw 4 is achieved through a drive motor 2 provided at one end of the lead screw 4. The drive motor 2 is coupled with a control system 12 of the stripping mechanism of this embodiment, and the control system 12 controls turning on/off of the drive motor 2 as well as its rotation direction. The control system 12 is provided with two buttons, i.e., a forward button and a backward button. The forward button could control the platform 6 to move toward the blade 11 and control the automatic alcohol-spraying module to spray alcohol, while the backward button could control the platform to return to its initial position and control the automatic alcohol-spraying module to stop spraying alcohol, thus achieving automation of the film-stripping.

The base 1 is also provided with guide rails 5. The platform 6 cooperates with the guide rail 5 so that the platform 6 moves along the guide rail 5, thus ensuring steady movement of the platform 6 without any swinging deviation. The platform 6 is provided with a substrate placement platform 8, on which the substrate to be stripped of film is placed so as to provide a safe and steady position for placing the substrate to be stripped of film. Further, the substrate placement platform 8 is provided with a stopper 9 at its edge, and the stopper 9 is used to catch substrates to be stripped of film placed on the substrate placement platform 8 so as to prevent displacement of the substrate to be stripped of film on the substrate placement platform 8. In this embodiment, the stoppers 9 are preferably disposed on a side of the substrate placement platform 8 away from the blade 11 and another side perpendicular to this side, such that it is possible to ensure the substrates to be stripped of film do not move when the blade 11 applies counter force to the substrates. However, it is to be understood by the skilled person in this art that, in order to prevent displacement of the substrate to be stripped of film on the substrate placement platform 8, the stoppers 9 may also be provided on the substrate placement platform 8 in other ways. The stopper 9 may be made of plastics, for example, to avoid breakage of the substrate to be stripped of film occurring when contacting with hard objects.

In this embodiment, the blade 11 is secured through the following configuration. Specifically, the base 1 is provided with blade brackets 7 located at both sides of the guide rail 5, and the blade bracket 7 is mounted with a blade holder 10 thereon. The blade holder 10 comprises two holding plates, that is, the upper and lower holding plates, and the blade 11 is gripped and secured between the two holding plates. In order to meet the requirements of film-stripping for substrates to be stripped of film of different thicknesses, the blade bracket 7 of this embodiment is disposed with an elongate fixing hole, into which the blade holder 10 is mounted. Since the fixing hole is of an elongate shape, it is adjustable for the height of the mounting position of the blade holder 10 in the fixing hole and the inclination of the blade 11, thus achieving adjustability of the distance between the substrate placement platform 8 and the blade 11, and widening applicability of the stripping mechanism of this embodiment.

The automatic alcohol-spraying module comprises an alcohol container 14 for storage of alcohol, a pump 15 connected to the alcohol container 14, and a conduit connected to the pump 15. The outlet of the conduit is disposed in the proximity of the blade 11, such that the alcohol can flow evenly onto the substrate to be stripped of film along the blade 11 after being injected. An alcohol preservation groove may be made on the blade holder 10 so as to permit an even and continuous running of the alcohol. Specifically, the lower holding plate of the blade holder 10 is disposed with a groove to form a gap between the lower holding plate and the blade 11, which is interfaced with the outlet of the aforesaid conduit. The gap has a width being consistent with that of the blade 11 and a uniform thickness. That is to say, it is ensured the alcohol is sprayed onto the substrate to be stripped of film evenly and continuously. In this embodiment, the pump 15 is connected to the control system 12, the turning on/off of the pump 15 is controlled with the forward button and backward button of the control system 12.

Furthermore, in the aforesaid film stripping mechanism, for the relative movement between the platform 6 and the blade 11, it is also possible to secure the platform 6 onto the base 1 while the blade 11 is provided to be movable with respect to the platform 6, with other configurations remaining unchanged. With such a configuration, the relative movement of the platform 6 and the blade 11 can be similarly achieved, thereby stripping of films on the substrate.

From the above embodiments, the present invention, by arranging the blade and the platform to be movable relative to each other, preferably by fixing the blade and making the substrate to be stripped of film move with respect to the blade while being placed on the platform, and by further cooperating with the automatic alcohol-spraying module, uses the blade to achieve stripping off the film on the substrate, hence the manual operation is substituted with an automatic mechanism, improving the yield rate of film stripping, the stripping efficiency and reducing the breakage rate of the substrate.

The above embodiments are only preferable embodiments of the present invention, it is noted that several improvement and alternation may also be made by those skilled in the art without departing from the technical principle of the present invention, and should be deemed as falling into the protective scope of the present invention.

What is claimed is:

1. A film stripping mechanism, comprising:
   a base;
   a platform disposed on the base and having a substrate to be stripped of film placed thereon; a blade disposed above an upper surface of the platform and capable of contacting the substrate to be stripped of film placed on the platform, the platform and the blade being movable relative to each other so as to strip off a film on the substrate to be stripped of film;
   an automatic alcohol-spraying module contacting the blade for spraying outwards alcohol and allowing the alcohol to flow toward the substrate to be stripped of film along the blade.

2. The film stripping mechanism according to claim 1, wherein the platform is movably disposed on the base and the blade is fixedly disposed above the upper surface of the platform.

3. The film stripping mechanism according to claim 2, wherein a first stationary platen and a second stationary platen are disposed on the base along a moving direction of the platform, the platform being located between the first stationary platen and the second stationary platen, the first stationary platen, the platform and the second stationary platen each comprising a respective threaded bore that is coaxial with each other and threadedly fitted with a lead screw, one end of the lead screw connected to a drive motor, the drive motor driving the lead screw to rotate and rotation thereof in turn driving the platform to move.

4. The film stripping mechanism according to claim 3, wherein the base is provided with guide rails, and the platform cooperates with the guide rails and moves along the guide rails.

5. The film stripping mechanism according to claim 4, wherein the base is provided with a blade bracket at each side of the guide rail, the blade bracket provided with a blade holder thereon, the blade disposed on the blade holder.

6. The film stripping mechanism according to claim 5, wherein the blade bracket comprises an elongate fixing hole, in which the blade holder is mounted.

7. The film stripping mechanism according to claim 5, wherein the blade holder comprises two holding plates of an upper plate and a lower holding plate, and the blade is disposed between said two holding plates; the lower holding plate comprising a groove such that a gap is formed between the lower holding plate and the blade, the gap being coupled with the automatic alcohol-spraying module.

8. The film stripping mechanism according to claim 7, wherein the automatic alcohol-spraying module comprises an alcohol container for storage of alcohol, a pump connected to the alcohol container, and a conduit connected to the pump, and wherein an outlet of the conduit is interfaced with the gap, which has a width being consistent with the blade and a uniform thickness.

9. The film stripping mechanism according to claim 8, wherein the stripping mechanism further comprises a control system respectively connected to the drive motor and the pump for controlling start, stop and rotation direction of the drive motor and turning on and off of the pump.

10. The film stripping mechanism according to claim 3, wherein the platform is provided with a substrate placement platform, the substrate placement platform provided with a stopper at its edge, and wherein the stopper is used to catch the substrate to be stripped of film placed on the substrate placement platform.

* * * * *